United States Patent [19]

Kato et al.

[11] 4,446,472

[45] May 1, 1984

[54] ELECTROPHOTOGRAPHICALLY INFORMATION RECORDING METHOD

[75] Inventors: Hideaki Kato; Hideyuki Handa, both of Tokyo, Japan

[73] Assignee: Konishiroku Photo Industry Co., Ltd., Tokyo, Japan

[21] Appl. No.: 433,351

[22] Filed: Oct. 7, 1982

Related U.S. Application Data

[63] Continuation of Ser. No. 154,572, May 29, 1980, abandoned.

[30] Foreign Application Priority Data

Jun. 2, 1979 [JP] Japan .................................. 54-68209
Jun. 2, 1979 [JP] Japan .................................. 54-68210

[51] Int. Cl.³ .......................................... G01D 15/14
[52] U.S. Cl. .............................. 346/153.1; 355/3 R; 355/14 SH
[58] Field of Search ................. 355/3 R, 3 SH, 14 R, 355/14 SH, 77; 346/153.1, 160; 358/300, 302

[56] References Cited

U.S. PATENT DOCUMENTS

| | | | |
|---|---|---|---|
| 3,149,201 | 9/1964 | Huber et al. ........................ | 358/300 |
| 3,743,413 | 7/1973 | Sharp et al. ..................... | 355/3 R X |
| 3,976,374 | 8/1976 | Hickman ........................... | 355/14 R |
| 4,026,642 | 5/1977 | Tanaka et al. ................... | 358/300 X |
| 4,134,668 | 1/1979 | Coburn ............................. | 358/300 X |
| 4,211,483 | 7/1980 | Hannigan et al. ............... | 355/14 R |
| 4,268,159 | 5/1981 | Tashiro ............................. | 355/3 R |

*Primary Examiner*—Fred L. Braun
*Attorney, Agent, or Firm*—James E. Nilles

[57] ABSTRACT

An electrophotographically information recording method of recording the external information on recording paper by forming the information as an electrostatic latent image on a charged photosensitive element and then by electrophotographically treating the electrostatic latent image. When the information can be introduced within the predetermined information introduction time, the recording operations is accomplished by the electrophotographic treatment subsequently to the introduction. When the information cannot be wholly introduced within the predetermined information introduction time, the electrophotographically treating operations excepting the formation of the electrostatic latent image on the photosensitive element and the feed of the recording paper are continued, so that these remaining operations of the formation of the electrostatic latent image and the feed of the recording paper are started immediately after the introduction of the information.

6 Claims, 7 Drawing Figures

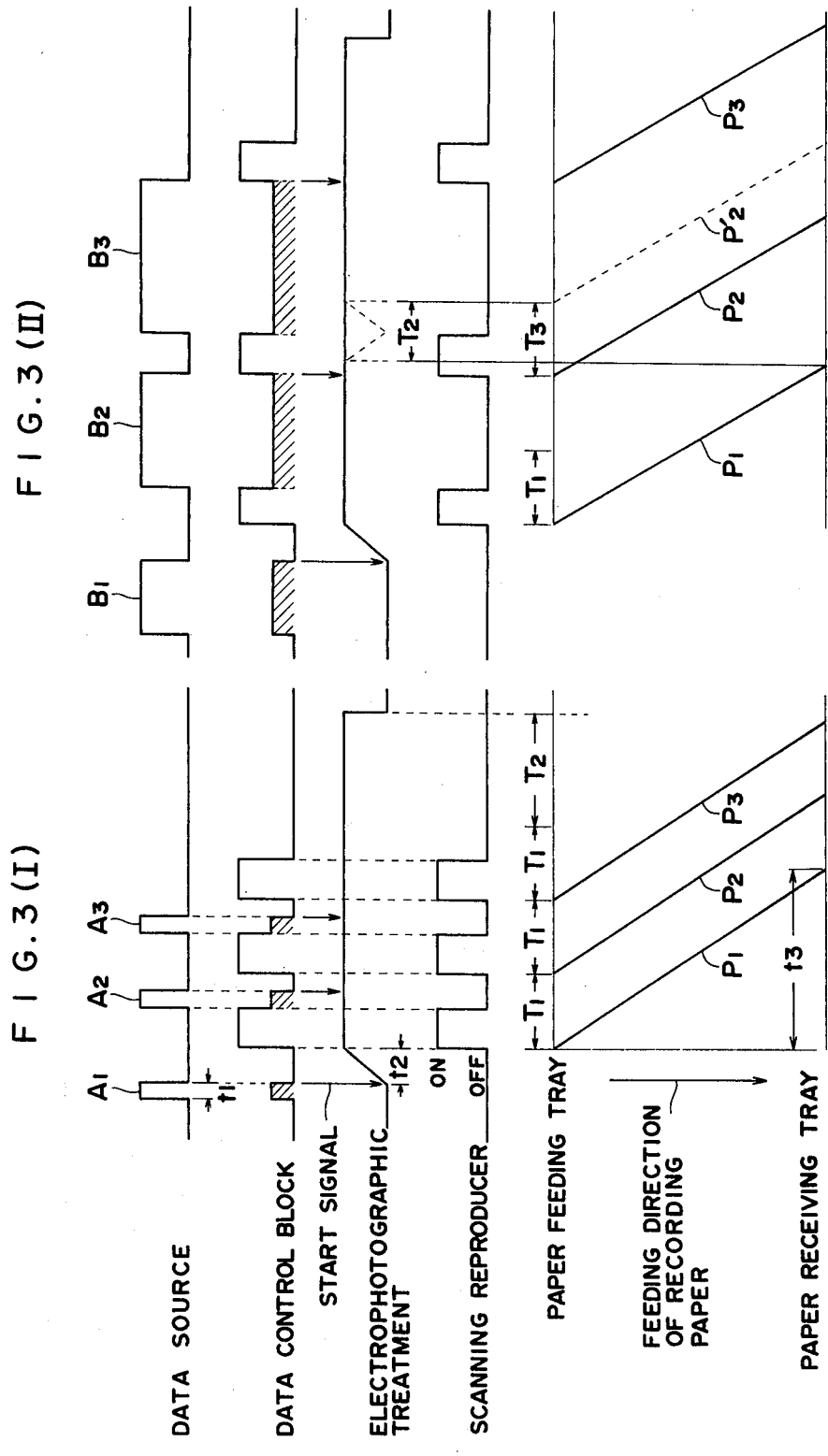

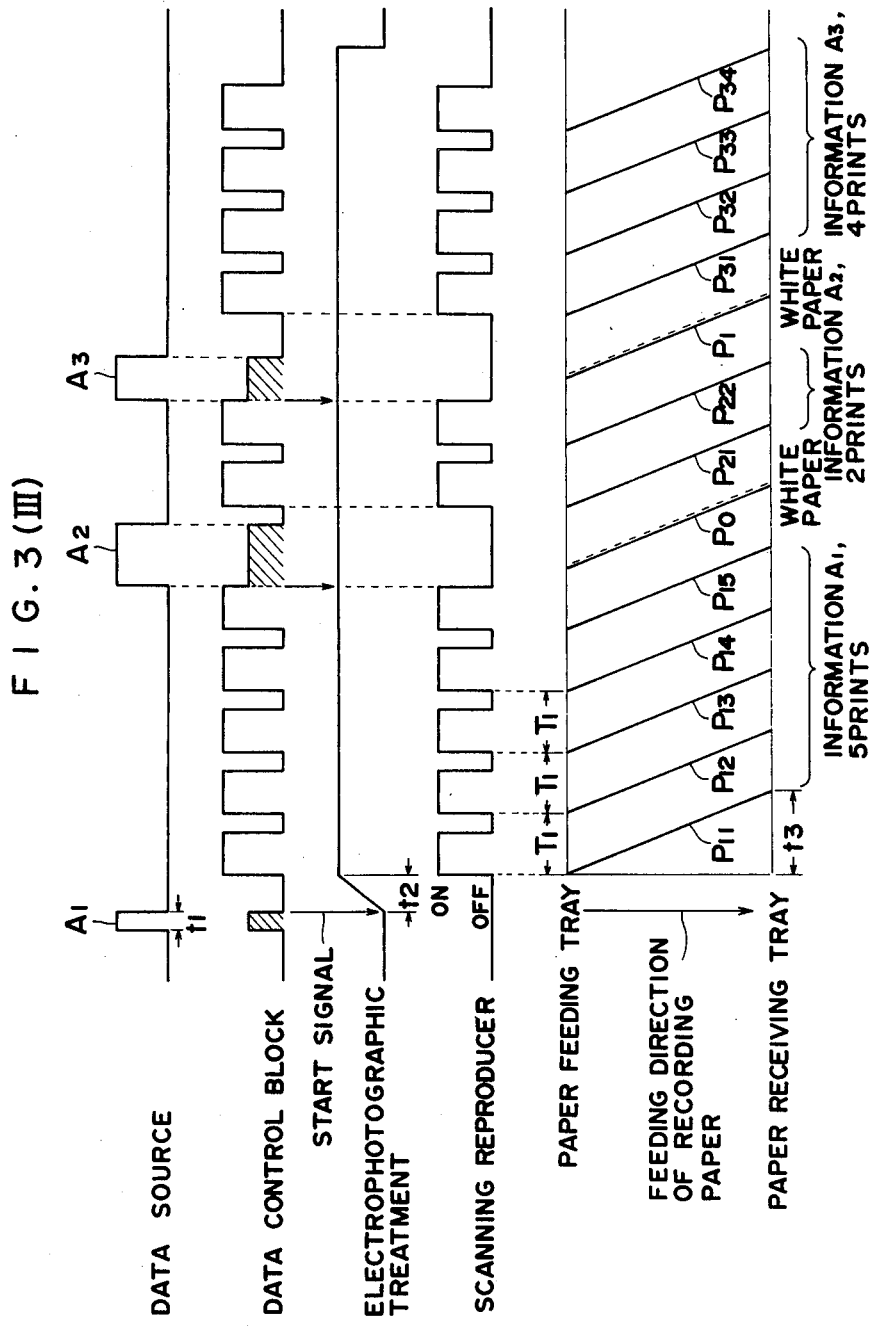

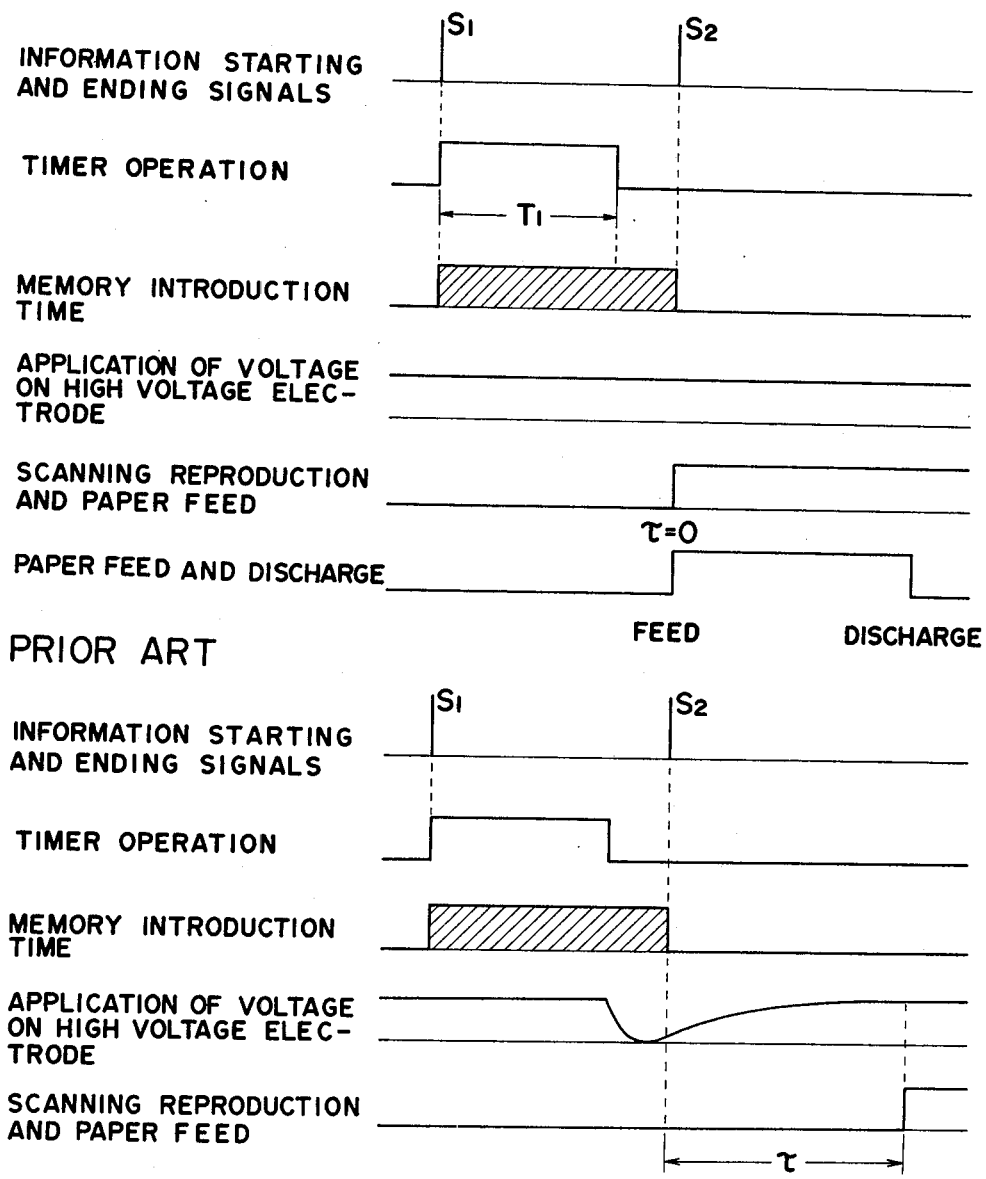
F I G. 5

ELECTROPHOTOGRAPHICALLY INFORMATION RECORDING METHOD

This application is a continuation of application Ser. No. 154,572, filed May 29, 1980, now abandoned.

BACKGROUND OF THE INVENTION

1. Field of the Invention

The present invention relates to an electrophotographically information recording method of recording the information, which is supplied in the form of electric signals from an information device such as an electronic computer, as a visible image on recording paper by forming the image as an electrostatic latent image on a photosensitive element and then by electrophotographically treating the electrostatic latent image. More specifically, the present invention relates to an information recording method which can facilitate the discriminations between the sheets of the recording paper containing different pieces of information and which can minimize the reduction in the treating capacity due to an information source having a low information transfer speed.

2. Description of the Prior Art

Recently, the electrophotographic recorder as shown, for example, in U.S. Pat. No. 4,134,668 has been being used in the terminal device of a computer, an output device of the information to be transmitted through a communication circuit or the output reader of a facsimile. In one mode of the electrophotographic recorder, the information, which is supplied in the form of electric signals from the outside, is converted into an optical image by means of a scanning reproducer such as an optical fiber tube, a thin-window recording tube, a needle electrode or a laser beam scanner so that it is recorded as an electrostatic latent image on a photosensitive element which is uniformly charged. The electrostatic latent image is developed with a developing agent into a visible image, which is either fixed as a recorded image as it is or transferred to the recording paper and then fixed to produce a final picture image. A series of the treating steps to treat the electrostatic latent image thereby to produce the final picture image are called the electrophotographic treatment and are adopted in the usual electrophotographic copier. The electrophotographic treatment includes the steps of uniformly charging a photosensitive element by turning a photosensitive drum at a constant speed, forming an electrostatic latent image by projecting an optical image upon the photosensitive element charged, developing the electrostatic latent image with a developing agent, transferring the developed image to recording paper, thermally fixing the transferred image, while removing the charges left on the surface of the photosensitive element after the transfer, and cleaning the toner left on the surface of the photosensitive element. The time period required for the original exposing step for forming the electrostatic latent image; and for the treating cycle of one electrophotograph is constant, and a sheet of copied image is recorded usually for one electrophotographically treating cycle. Thus, because the electrophotographic treatment is adopted, a time period, which is predetermined by the series of the treating steps, is required for the electrophotographic information recorder to accomplish the recording treatment. In the electrophotographic information recorder according to the prior art, therefore, the feed of the recording paper is performed each predetermined time so that the number of the sheets of the recording paper to be treated for the predetermined time is accordingly determined. For example, the copying time of one sheet is 6 seconds for intermittent copying and 2 seconds for continuous copying.

On the other hand, the information to be recorded by the electrophotographic information recorder is supplied in the form of electric signals from the outside and is generally various from remarkably quick to remarkably slow because of the variety in the performance of the information processing device to be connected therewith. For example, there is an information source such as a magnetic tape, by which much information transfer is effected within a short time period, or an information source such as a punched tape, by which it takes much time to transfer the information. Generally, 110 characters per second can be transferred in case of punched tape and 9,600 characters per second can be transferred in case of TELETYPE (Trade Name), whereas 3,000 characters can be stored on one sheet. For the interval between one electrophotographic treating cycle and the subsequent electrophotographic treating cycle, the information to be recorded during the subsequent electrophotographic treating cycle is introduced from an external information source and is transformed into a video signal. Because of the variety in the transfer speed and quantity of the information, however, the constant time interval, which is predetermined by the electrophotographic treatment, may be either short or sufficient for the introduction and transforming of the information.

If the information processing device has a sufficient capacity, external information to be subsequently recorded can be received and transformed while recording the preceding information on the photosensitive element. However, it is impossible to do if the information processing device has not such a large capacity that the quantity of information corresponding to more than single sheet or page of the recording paper can be stored. Such information processing device having a large capacity causes the construction to be complicates and the cost to be increased.

According to the usual electrophotographic information recorder, on the other hand, since the time period required for the electrophotographic treatment is constant irrespective of the levels in the quantity and transfer speed of the information to be recorded, the number of sheets of the recording paper to be treated for the present time period is restricted. In the electrophotographic information recorder, therefore, the preset information introduction time relating to the electrophotographic treatment is predetermined. In the recorder thus far described, in case the transfer speed of the information to be recorded is so low that the information introduction is not completed within the predetermined information introduction time, the subsequent electrophotographic treating operations are interrupted, but the information introduction itself is continued. After that, the electrophotographic treating operations are started again from the instant, when the information introduction is completed, thus practising the recording operations. However, as the voltage circuit for applying a high voltage on electrodes such as a charging electrode, a charge removing electrode and a separating electrode has a high time constant, it takes much time to reach the voltage at a predetermined level. A predetermined sufficient elapse time has to be taken especially for the charging operation of the photosensitive element which will determine the quality of the picture image. Accordingly, a considerable time of, for example, at least several seconds is wasted before the electrophotographic treating operations are started again after the information introduction is completed. This is not desired in view of the effective use of the recording time. This effective use of the recording time is an important problem especially when it is considered that the electrophotographic information recorder is used for the terminal device of the computer or the output device of the information to be transmitted through the communication circuit, which device is used to process the information to be transferred at a high speed.

Moreover, the case, in which the external information is recorded by the electrophotographic recorder of this kind, is divided into the case, in which the same information is recorded in a single sheet, and into the case in which the information is recorded in plural sheets. In case different pieces of information are to be recorded in multiple sheets, it is convenient that those sheets of the recording paper are recognized for the different pieces of information. For this reason, it is sufficient that the discriminating paper such as color paper or tape is inserted between the different sheets of the recording paper. For this purpose, there have conventionally been proposed a variety of methods for inserting the discriminating paper. In one example proposed, a color tape is prepared for the discriminating paper independently of the recording paper and when it is detected that the information to be recorded is different, the feeding and cutting mechanisms of the color tape are controlled in accordance with the movements of the recording paper thereby to insert the cut sheet of the color tape between the sheets of the recording paper to be discharged. Another mechanism is made so similar to the above as to include a discriminating paper feeder and a controller which is operative to control the feeder in relation to the operation of the recording paper. In addition to these recording paper feeder and controller which are intrinsic, therefore, a discriminating paper feeder and its control system are required with the resultant disadvantage that the recorder has its construction complicated to raise the production cost.

SUMMARY OF THE INVENTION

The present invention has been conceived in view of the disadvantages thus far described and contemplates to provide a method in which the recorder is held under the idling condition for the predetermined time period and the electrophotographic treatment can be started in accordance with the transfer time of the recording information so that the recording time for the case, in which the transfer time is long, may be effectively utilized. Accordingly, the time period required for preparing the photosensitive element for the next recording can be eliminated, and the electrophotographically treating system can be held under a stable condition at all times, with the result of advantage that the picture quality of the recording image is made excellent. Moreover, the high voltage circuit for applying a high voltage on the devices for the charging, transfer, separation and discharging operations need not be turned on and off for each sheet of the recording paper so that the switching elements, which are made coactive with the high voltage application to the electrodes, can be prevented from being damaged and from having their lives shortened.

According to another feature of the present invention, recording paper itself is inserted under its unrecorded condition between the sheets of the recording paper having different pieces of information, in case different pieces of information are to be recorded in multiple sheets. According to this method, the paper feeder and the controller of the discriminating paper can be eliminated, and the recording paper feeder and the controller to be used for the usual electrophotographic treatment can be used, as they are, for the paper feed and control of the discriminating paper so that the recorder can have its construction simplified and its cost reduced.

According to another feature of the present invention, during the feeding period of the discriminating paper, the subsequent information to be recorded is introduced. In the electrophotographic recorder, more specifically, the information to be recorded is received in the form of electric signals from a variety of external information sources. The introduction of the external information is accomplished during the electrophotographic treating cycle for each sheet of the recording paper. The time period required for the electrophotographic treatment of one sheet of the recording paper is restricted by the operations of the electric and mechanical treating system of the recorder. On the contrary, the transfer time for the external information to be introduced by the recorder is variable. Therefore, if the feeding interval of the recording paper is determined at the minimum value that is determined from the operations of the electric and mechanical treating system of the recorder, the external information to be subsequently recorded may occasionally fail to be completely introduced. According to the present invention, therefore, the time period for feeding the discriminating paper is utilized, while maintaining the feeding interval of the recording paper at the minimum, thereby to introduce the information to be recorded. Since the feeding period of the discriminating paper assigns the same time as that required for the electrophotographic treatment of the single sheet of the recording paper to the introduction of the information to be recorded, the fitting capacity is remarkably improved for the information source having a slow information transfer speed.

Further objects and features of the invention will be fully understood from the following detailed description with reference to the accompanying drawings, wherein:

BRIEF DESCRIPTION OF THE DRAWINGS

FIGS. 3(I), 3(II) and 3(III) are charts for illustrating the operations of the electrophotographic recorder according to the present invention, respectively;

FIG. 5 is a chart for comparing the operation of the present invention and the operation of the prior art.

DESCRIPTION OF THE PREFERRED EMBODIMENT

Figure 1:
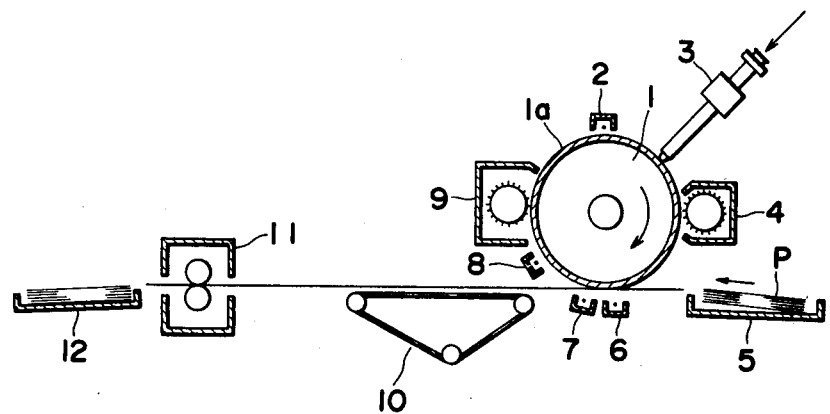
FIG. 1 is a diagrammatic view showing the construction of an electrophotographic recorder according to the present invention.

FIG. 1 shows the diagrammatic construction of the electrophotographic recorder according to the present invention. A photosensitive drum 1 which is made rotatable at a constant speed is formed with a photosensitive element 1a on its surface. There are arranged around the photosensitive drum 1, a charge electrode 2 for uniformly charging the photosensitive element 1a, a scanning reproducer 3 for projecting and focusing the optical image, which corresponds to the external information such as the output signals from an electronic computer, upon the charged photosensitive element 1a, a developer 4 for developing the electrostatic latent image which is formed on the photosensitive element 1a by the scanning reproducer 3, a transfer electrode 6 for transferring the developed external information to recording paper P fed from a recording paper feeding tray 5, a separating electrode 7 for separating the recording paper bearing the transferred image from the photosensitive drum 1, a discharge electrode 8 for removing the charges which are left on the surface of the photosensitive element 1a after the recording paper is separated, and a cleaner 9 for removing the residual toners from the surface of the photosensitive element 1a. The recording paper separated from the photosensitive element 1a is conveyed by a conveyor 10 to a fixer 11, where the toner image is fixed to the recording paper, which is then discharged into a recorded paper receiving tray 12.

Figure 2:
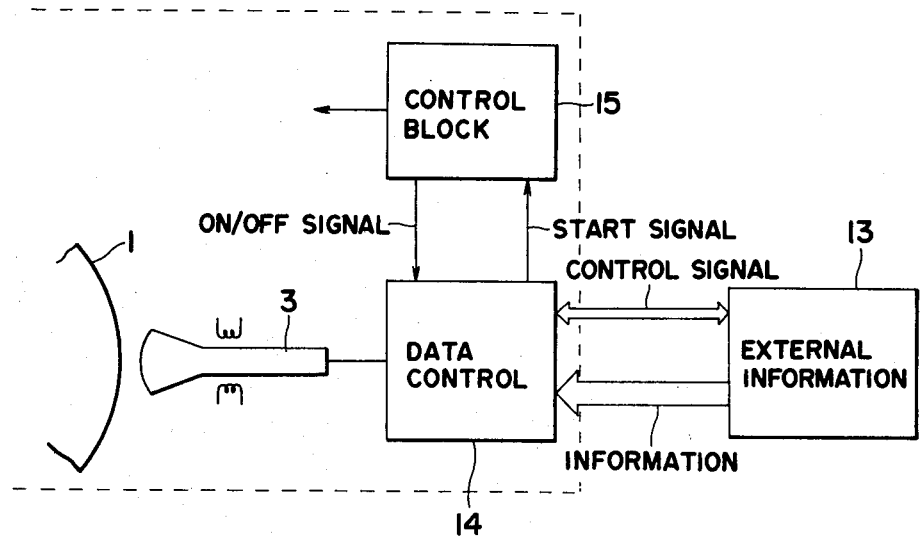
FIG. 2 is a block diagram showing the information transfer between the electrophotographic recorder and an external information source and a control system.

The information transfer and control system between the electrophotographic recorder according to the present invention and the external information source is shown in a block diagram in FIG. 2. In this Figure, an external information source 13 is, for example, the terminal device of a computer or the transmission line of a communication circuit and supplies to a data control block 14, which contains the data memory mounted in the recorder, an electric signals of the external information in accordance with the data requiring signals from the control block 14. When the data memory is stored with the information corresponding to the single sheet of the recording paper, the supply of the information from the external information source 13 is interrupted, and a record starting signal is fed to an electrophotographic treatment control block 15. In response to this record start signal, the operations of the mechanical and electric systems, which are necessary for a series of the electrophotographic treating operations such as the rotations of the photosensitive drum, the drive of the paper feeding rollers, the energizations of the charge, transfer and separating electrodes or the operation of the fixer, are started in a predetermined sequence. After a predetermined time, i.e., after the time period required for preparing the photosensitive element for the next recording, an ON signal for starting the scanning reproducer 3 is fed from the control block 15 to the data control block 14.

The operations of the electrophotographic recorder according to the present invention will now be described with reference to FIGS. 3(I) and 3(II), the former corresponding to the case, in which the information transfer time is short, i.e., the case of the high speed transfer information source, whereas the latter corresponding to the case of the low speed transfer information source. In both the Figures, the abscissa indicates the elapse of time. Description is first made upon FIG. 3(I), in which $A_1$ indicates the external information corresponding to the single sheet or page of the recording paper to be transferred from the external information source 13. During the time period $t_l$ for which the transfer is made with that external information, the data control block 14 is in its receiving mode (as indicated at hatched regions) of the information. The control block 14 feeds the record start signal to the electrophotographic treatment control block 15 when it detects the information ending signal (or the end mark) which is contained at the trailing end of the information. The control block 15 operates the electric and mechanical systems, which are required for the electrophotographic treatment, when it receives the start signal. First of all, the photosensitive drum 1 is turned, and the photosensitive element 1a is charged by the charge electrode 2. In synchronism with the motions of this photosensitive drum, the developing, transferring, separating, discharging and cleaning operations are accomplished in the predetermined sequence. In this instance, it takes one time period $t_2$ for the photosensitive element 1a on the photosensitive drum 1 to reach the information writing position by the scanning reproducer 3. When that writing position is reached, the ON signal for operating the scanning reproducer 3 is generated from the control block 15 to the control block 14. As a result, the scanning reproducer 3 is brought into its operative condition, and the signal, which has been stored in the data memory of the control block 14, is transformed into a video signal and then fed to the scanning reproducer 3, where it is converted into an optical image so that it is written on the photosensitive element 1a. Substantially simultaneously with the generation of the ON signal, the recording paper P is fed from its tray 5 by the drive of the paper feed rollers (not shown) arranged at the tray 5. The electrostatic latent image thus formed on the photosensitive element 1a is electrophotographically treated, and the resultant recorded paper is discharged after a time period $t_3$ into the recorded paper receiving tray 12. If the path between the tray 5 and the photosensitive drum 1 is long, further feed rollers may be arranged in the vicinity of the photosensitive drum 1.

If the external information $A_2$ to be recorded in the next page is transferred during the time period $t_3$, for which the electrophotographic treatment of the first page is not ended, it it received by the control block 14 and is stored in the data memory simultaneously as the writing of the precedent external information $A_1$ on the photosensitive element 1a is ended. Similarly to the precedent operation, the information ending signal of the external information $A_2$ is detected so that the start signal is fed to the control block 15. Then, as soon as the electrophotographically recording treatment of the first page is ended, the ON signal is fed from the control block 15 to the control block 14 thereby to operate the scanning reproducer 3 and to drive the paper feed rollers so that the recording paper for the information $A_2$ is fed. The time period $T_1$ from the feed of the first sheet of the recording paper to the feed of the second sheet of the recording paper is the minimum period that is determined by the electrophotographic treatment so that it cannot be shortened any more. As a result, it can be said that the time period is effectively utilized. Absolutely similar operations are performed in case the external information $A_3$ to be recorded on the third page is transferred during the electrophotographically treating process of the first and second sheets of the recording paper, and the recording paper is fed after the time period $T_1$ which is determined by the electrophotographic treatment of the second page. In this case, since the feed of the third page is accomplished within the shortest time period, the time is not wasted. After that, in case the external information to be recorded in the fourth page is not transferred, the recording device is held such an electrophotographically treatable condition that the photosensitive drum is turned to uniformly charge the photosensitive element on the surface thereof and that the developer, the transfer, separating and discharge electrodes and the fixer are held under the operative condition. In other words, they are held under such a condition that the electrophotographic treatment can be entered as soon as the external information of the fourth page is tranferred. This particular condition is called as the "idling condition" in the present invention. In this "idling condition", it may be possible to hold the developer in inactive state. However, if the developer is held in active state, it is necessary to provide a special circuit on the scanning reproducer 3 so that the photosensitive element 1a is always exposed to a uniform light during the idling condition. In FIG. 3(I), the time period $T_2$ corresponds to the idling condition. This idling condition is continued for the predetermined time; period and is then ended in response to the stop signal from the control block 14.

The case of the low speed data source will now be described with reference to FIG. 3(III).

The information $B_1$ corresponding to one page, which is transferred from the external information source 13 at the beginning of the recording operation, is stored in the data memory of the control block 14 so that the record starting signal is fed to the control block 15 when the end signal contained at the trailing end of the information $B_1$ is detected. As a result, the electrophotographically treating system is operated in the predetermined sequence, and when the photosensitive element is substantially completely charged up the ON signal of the scanning reproducer 3 is fed from the control block 15 to the control block 14, and the paper feed is started. The external information signals, which are stored in the data memory, are transformed into a video signal and are then converted into an optical image so that they are written on the photosensitive element 1a. The electrostatic latent image thus formed on the photosensitive element 1a is electrophotographically treated, and the paper bearing the latent image is discharged into the recorded paper receiving tray 12 after the time period $t_3$ which is equal to the treating time period in the case of the high speed data source.

Figure 4:
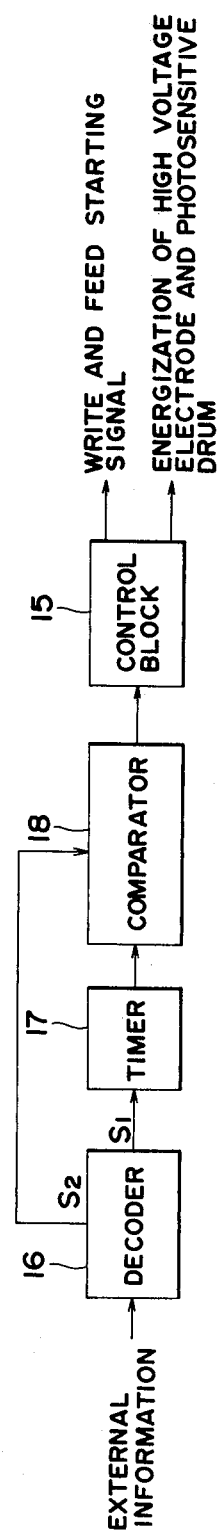
FIG. 4 is a block diagram for establishing the idling condition.

Now, if the external information $B_2$ to be recorded in the second page is transferred from the external information source 13, it begins to be stored in the data memory of the control block 14. Since, however, the information transfer speed is low, the introducing operation of the information $B_2$ is not ended but continued for the minimum time period $T_1$ that it determined by the electrophotographic treatment of the first sheet of the recording paper. When the introducing operation of the information $B_2$ is ended, the start signal is fed from the control block 14 to the control block 15. Simultaneously with this, the ON signal is fed from the control block 15 to the control block 14, and the information $B_2$, which has been stored in the data memory, is transformed into a video signal and fed to the scanning reproducer 3 so that it is instantly written on the photosensitive element 1a, followed by the electrophotographic treatment. The reason why those operations can be accomplished is that the electrophotographically treating system of the recorder is held under the electrophotographically treatable condition, i.e., under the idling condition even after the electrophotographic treatment of a single page. FIG. 4 is a block circuit diagram for establishing the idling condition. The signals $S_1$ and $S_2$ indicative of the start and end of the information for one page, which is contained in the external information signals, are read out by a decoder 16 so that the output of a timer 17, which is operative to count the minimum time period $T_1$ by using the information starting signal $S_1$ as a reference, is compared by a comparator 18 with the information ending signal $S_2$ coming from the decoder 16. Since, in the case of FIG. 3(II), the information ending signal $S_2$ is generated over the time period $T_1$, it controls the control block 15 thereby to energize the paper feeder and the scanning reproducer. Thus, after the elapse of the time period $T_1$, the idling condition is established. In the electrophotographic information recorder according to the prior art, at the instant when the electrophotographic treatment of the first page $P_1$ is ended, the electrophotographic treating system is returned to the condition, under which the electrophotographic treatment is impossible. After the time period $T_2$ to the instant when the electrophotographic treatable condition including the preparation of the photosensitive element for the next recording is restored, the recording operation of the second page $P_2$ is started, so that the time period $T_3$ is wasted, as compared with the present invention. These behaviors are illustrated in FIG. 5.

Likewise, the introduction of the information $B_3$ to be recorded in the third page $P_3$ is not ended before the discharge of the second page $P_2$. As soon as the introduction is ended, the start signal and the ON signal are simultaneously generated, and the information $B_2$ is transformed into a video signal and then written on the photosensitive element 1a by the action of the scanning reproducer 3 so that it is electrophotographically treated. This treatment can be accomplished because the electrophotographic treating system of the recorder is held under the idling condition even after the second page $P_2$ is discharged. How long the idling condition is maintained is a problem in design, and it is practically sufficient that the length is made twice the usual electrophotographic treating cycle.

According to the present invention, by holding the electrophotographic recorder under the idling condition for a predetermined period, even the external information having a low transfer speed can be written on the photosensitive element and electrophotographically treated as soon as its introduction is completed. Therefore, as compared with the conventional recorder of this kind, in which all the steps of the electrophotographic treatment are repeated for each sheet of the recording paper, the recording operations according to the transfer speed of the external information are enabled so that the present invention can be utilized as the output device of a wide variety of external information sources while making effective use of the recording time period. Since, moreover, the electrophotographic treating system of the recorder is held under the idling condition, the electric performance can be so stabilized that the picture quality of the recorded image can be made excellent and uniform. Moreover, a high voltage is applied on the charge, transfer, separating and discharge electrodes of the electrophotographic treating system, and in the conventional recorder, since the impression of the high voltage is turned on and off for each sheet of the recording paper, the switching elements have their damages increased and their lives shortened. However this defect can be lightened according to the present invention by establishing the idling condition.

The operations of another embodiment of the electrophotographic recorder according to the present invention will now be described with reference to FIG. 3(III). In the shown example, the external information $A_1$ is recorded in five sheets, the external information $A_2$ is recorded in two sheets, and the external information $A_3$ is recorded in four sheets, and white paper is inserted as discriminating paper between the sheets of recording paper having different pieces of information.

Since the external information $A_1$ is stored in the data memory of the control block 14, upon the recording operation of a second sheet of recording paper $P_{12}$, the ON signal is generated in the electrophotographical treatment control block 15 at the instant when the minimim time period $T_1$ determined by the electrophotographic treatment elapses after the feed of the first sheet of recording paper $P_{11}$, thereby to bring the scanning reproducer 3 into its operative condition. Then, the information $A_1$ which is stored in the data memory is again transformed into a video signal in the same manner as before and is fed to the scanning reproducer 3 so that it is written on the photosensitive element $1a$. Simultaneously with this, the second sheet of recording paper $P_{12}$ is fed. Thus, the second sheet of the recording paper $P_{12}$ is also recorded with the external information $A_1$. Likewise, the third, fourth and fifth sheets of recording paper $P_{13}$, $P_{14}$ and $P_{15}$ are recorded with the same information $A_1$ and are consecutively discharged. In this meanwhile, the five sheets of the recording paper are consecutively fed with the minimum time interval.

Simultaneously as the information writing operation for the fifth sheet of the recording paper $P_{15}$ is ended, the introduction of the external information to be next recorded is started. Since, in the example shown, the transfer speed of the information $A_2$ is low, the recording paper $P_O$ is fed at the normal time interval and is discharged while being recorded with no information. That particular recording paper $P_O$ acts as the discriminating paper to discriminate the recorded sheets of paper $P_{11}$ to $P_{15}$, which have the information $A_1$ recorded, and the recorded sheets of paper $P_{21}$ and $P_{22}$ which contain the information $A_2$ to be subsequently recorded.

According to the embodiment thus far described, when the information ending signal $S_2$ arrives after the predetermined time period $T_1$, the comparator 18 is made to generate the output, by which the scanning reproducer 3 is deenergized. On the other hand, since the paper feeder, the high voltage electrode, the conveyor and the fixer are operated in the normal sequence, the recording paper is then discharged while bearing no information recorded.

After the time period $T_1$ after the feed of the recording paper $P_O$ which has been used as the discriminating paper, the ON signal is generated in the control block 15, and the information $A_2$, which has already been stored in the data memory after the introduction, is transformed into a video signal and fed to the scanning reproducer 3 so that it is written on the photosensitive element $1a$. Thus, by the usual electrophotographic treatment, the recording paper $P_{21}$ is recorded with the information $A_2$ and is discharged. The other recording paper $P_{22}$ is also subjected to the similar recording treatment and is discharged while bearing the same information $A_2$.

Absolutely in the same manner as the case of the external information $A_2$, the introduction of the external information $A_3$ is started simultaneously with end of the writing operation of the information $A_2$ in the recording paper $P_{22}$. The fact that the recording paper $P_1$ left white is discharged as the discriminating paper in the meanwhile is absolutely the same as the case of the recording paper $P_O$, as has already been described. The information $A_1$ is stored in the data memory of the control block 14 and is used to effect the recording operations of the four sheets of recording paper $P_{31}$ to $P_{34}$. The recording operations of the respective sheets of the recording paper are absolutely the same as the cases of the pieces of the information $A_1$ and $A_2$, as has been described before, and their explanations are omitted here. The discriminating paper $P_1$ is useful in discriminating the sheets of the recording paper $P_{21}$ and $P_{22}$, which are recorded with the information $A_2$, and the sheets of the recording paper $P_{31}$ to $P_{34}$ which are recorded with the information $A_3$.

According to the embodiment of the present invention thus far described, since the recording paper bearing no information, i.e., the so-called "white paper" is inserted between the sheets of the recording paper having different pieces of information by the use of the usual recording paper feeder, the sheets of the recording paper can be discriminated and divided for each piece of information in case the different pieces of information are to be recorded in multiple sheets of recording paper. Since, moreover, the mechanism for inserting the discriminating paper is the usual recording paper feeder itself, an advantage over the conventional recorder, in which an additional feeding mechanism is provided, can be obtained in that the construction is simplified while reducing the production cost. According to another important feature of the present invention, since the information to be recorded in the subsequent recording paper is introduced during the time period while the discriminating paper is being fed and inserted, it becomes possible to sufficiently introduce even the information having such a low transfer speed as cannot be introduced at the usual feeding interval of the recording paper. Thus, the recorder according to the present invention can be applied a wide variety of information sources irrespective of the level of the information transfer speed.

What is claimed is:

1. A method of operating apparatus for recording information;

said apparatus comprising an outside source (13) for transferring information in the form of electric signals by means of an information transfer and control system to an electrophographic recorder for formation by the latter into images on recording paper;

said information transfer and control system comprising a data control block (14), an electrophotographic treatment block (15) and a memory;

said electrophotographic recorder comprising the following components: a constant speed rotatable drum (1) having a photosensitive element (1a) thereon, a charging electrode (2), a scanning reproducer (3), a developer (4), a transfer electrode (6), a separating electrode (7), a discharge electrode (8), a cleaner (9), a toner fixer (11), and paper feeding means operable to feed a sheet of paper from a paper feeding tray (5) to said drum, to said toner fixer and to a receiving tray (12) within a paper feed time period ($t_3$), said recorder requiring a photosensitive element travel time period ($t_2$) for the photosensitive element to reach said scanning reproducer; said recorder requiring a minimum treatment time period ($T_1$) for completing one cycle of operation measured from the start of the feed of one sheet of paper to the start of the feed of the next sheet;

said method comprising the steps of:

operating said outside source to transfer to said information transfer and control system successive blocks of information in which each block contains a start signal (S1) and an end signal (S2) and requires an information transfer time period ($t_1$) to be transferred;

operating said data control block (14) so that it responds to receipt of an end signal (S2) to provide a recorder start signal to said treatment block to initiate sequential operation of all afore-mentioned components of said recorder, except said scanning reproducer and said paper feeding means, and to initiate operation of said scanning reproducer and said paper feeding means after passage of said photosensitive element travel time period ($t_2$);

operating said apparatus so that, when said information transfer time period ($t_1$) is equal to or less than said minimum treatment time period ($T_1$), operations of said scanning reproducer and said paper feeding means by provision of said recorder start signal are commenced subsequent to receipt of an end signal by said data control block;

further operating said apparatus so that, when said information transfer time period ($t_1$) is greater than said minimum treatment time period ($T_1$), operations of all components of said recorder, except operation of said scanning reproducer and said paper feeding means, are continued so that formation of a latent image on said photosensitive element and operation of said paper feeding means can be started immediately upon receipt of a recorder start signal by said electrophotographic treatment block from said data control block.

2. A method according to claim 1, which includes the steps of: storing a block of information in said memory; clearing said last-mentioned block of information after it has been recorded on a predetermined number of sheets of the recording paper; and discharging a sheet of recording paper in an unrecorded condition before another block of information to be subsequently recorded is stored.

3. A method according to claim 2, wherein the other block of information to be subsequently recorded is introduced and stored in said memory during a paper feed time period ($t_3$) while the recording paper in unrecorded condition is being discharged.

4. Apparatus for recording information comprising:

(I) an external information source (13) for supplying information in the form of successive blocks of electric information signals, each block containing a start signal (S1) and an end signal (S2) and requiring an information transfer time period ($t_1$) for transfer;

(II) an electrophotographic recorder comprising:
 (A) a member (1) operable to move at constant speed,
 (B) a photosensitive element (1a) on the surface of said member,
 (C) a charging electrode (2) adjacent said member and operable to electrostatically charge said photosensitive element,
 (D) a scanning reproducer (3) operable to project an optical image onto said photosensitive element to provide a latent image,
 (E) a developer (4) for developing said latent image,
 (F) a transfer means (6) operable to transfer an image on said photosensitive element to a sheet of recording paper (P),
 (G) a separating means (7) operable to separate a page of recording paper from said member,
 (H) a discharge means (8) operable to remove a remaining charge from said photosensitive element,
 (I) a cleaner (9) operable to remove residual toner from said photosensitive element,
 (J) a toner fixer (11),
 (K) paper feeding means operable to feed a sheet of paper from a paper feeding tray (5) to said member, to said toner fixer and to a receiving tray (12) within a paper feed time period ($t_3$),
 (L) said recorder requiring an element travel time period ($t_2$) for said photosensitive element to reach said scanning reproducer, said recorder having a minimum treatment time period ($T_1$) for one cycle of operation commencing with introduction of one sheet of paper until introduction of the next successive sheet of paper;

(III) and an information transfer and control system for transferring information signals from said external information source to electrophotographic recorder for reproduction on said recording paper and comprising a data control block (14) and an electrophotographic treatment control block (15);

(A) said data control block (14) comprising:
 (a) a means (16) operative to read a start signal (S1) and an end signal (S2) in each of said signal information blocks,
 (b) a means (17) operative to count the minimum treatment time period ($T_1$) using a start signal (S1) as a reference,
 (c) a means (18) operative to compare the information transfer time period ($t_1$) between the start signal (S1) and the end signal (S2) with the minimum treatment time period ($T_1$) for one cycle of operation and adapted to provide a recorder start signal to said treatment control block (15) when an end signal (S2) is detected,
 (d) and a memory for receiving, storing and releasing blocks of electric information signals;

(B) said treatment control block (15) operable in response to said recorder start signal from said control data block (14);
 (a) to initiate operation of said member,
 (b) to initiate simultaneous operation of said charging electrode,
 (c) and after lapse of an element travel timer period ($t_2$) during which said photosensitive element reaches said scanning reproducer,
  (i) to provide an ON (write) signal to start operation of said scanning reproducer,
  (ii) to release a block of electric information signals from said memory to said scanning reproducer for conversion to an image on said photosensitive element,
  (iii) to initiate operation of said paper feeding means,
  (iv) and to initiate synchronized sequential operation of said developer, transfer means, separating means, discharge means, cleaner and fixer;

(IV) said apparatus being operable in several modes including:
  (A) a first mode wherein information transfer speed is high and wherein, when said time period ($t_1$) for transfer of a block of information is equal to or less than said minimum time period ($T_1$) for one cycle of operation, operation of said scanning reproducer and said paper feeding means by provision of said start signal are commenced subsequent to receipt of an end signal by said data control block;
  (B) a second mode wherein information transfer speed is low and wherein, when said time period ($t_1$) for transfer of a block of information is greater than said minimum time period ($T_1$) for one cycle of operation, operation of all components of said recorder, except operation of said scanning reproducer and said paper feeding means, are continued so that formation of a latent image on said photosensitive element and operation of said paper feeding means can be started immediately upon receipt of a start signal by said electrophotographic treatment block from said data control block.

5. Apparatus according to claim 4, which further includes means for storing a block of information in said memory, means for clearing the last-recited stored information after it has been recorded on a predetermined number of sheets of recording paper; and means for discharging a sheet of recording paper is unrecorded condition before another block of information to be subsequently recorded is stored in said memory, that sheet in unrecorded condition serving to separate the said predetermined number of sheets from subsequent sheets bearing said other information.

6. Apparatus according to claim 5, which further includes means whereby the other block of information to be subsequently recorded is transmitted and stored in said memory during a paper feed period of time ($t_3$) while the sheet of recording paper in unrecorded condition is being discharged.

* * * * *